US012308042B2

(12) United States Patent
Elkhatib et al.

(10) Patent No.: US 12,308,042 B2
(45) Date of Patent: May 20, 2025

(54) MULTISTAGE LOW POWER, LOW LATENCY, AND REAL-TIME DEEP LEARNING SINGLE MICROPHONE NOISE SUPPRESSION

(71) Applicant: AONDEVICES, INC., Irvine, CA (US)

(72) Inventors: Mouna Elkhatib, Irvine, CA (US); Adil Benyassine, Irvine, CA (US)

(73) Assignee: AONDEVICES, INC., Irvine, CA (US)

( * ) Notice: Subject to any disclaimer, the term of this patent is extended or adjusted under 35 U.S.C. 154(b) by 0 days.

(21) Appl. No.: 17/654,462

(22) Filed: Mar. 11, 2022

(65) Prior Publication Data

US 2022/0293119 A1 Sep. 15, 2022

Related U.S. Application Data

(60) Provisional application No. 63/159,893, filed on Mar. 11, 2021.

(51) Int. Cl.

| | |
|---|---|
| ***G10L 21/0232*** | (2013.01) |
| ***G10L 21/034*** | (2013.01) |
| ***G10L 25/18*** | (2013.01) |
| ***G10L 25/21*** | (2013.01) |
| ***G10L 25/30*** | (2013.01) |

(52) U.S. Cl.

CPC ........ *G10L 21/0232* (2013.01); *G10L 21/034* (2013.01); *G10L 25/18* (2013.01); *G10L 25/21* (2013.01); *G10L 25/30* (2013.01)

(58) Field of Classification Search

CPC ............................ G10L 21/0232; G10L 25/30

See application file for complete search history.

(56) References Cited

U.S. PATENT DOCUMENTS

| | | | | |
|---|---|---|---|---|
| 9,886,966 | B2 * | 2/2018 | Dusan | G10L 15/20 |
| 11,456,007 | B2 * | 9/2022 | Kim | G10L 15/063 |
| 11,763,834 | B2 * | 9/2023 | Delcroix | G10L 21/0272 704/232 |
| 2014/0341386 | A1 * | 11/2014 | Cimaz | H04R 3/005 381/71.6 |
| 2021/0360349 | A1 * | 11/2021 | Nyayate | H04R 3/04 |
| 2022/0044696 | A1 * | 2/2022 | Kim | G10L 21/0232 |
| 2022/0262336 | A1 * | 8/2022 | Truong | G10K 11/17823 |

* cited by examiner

*Primary Examiner* — Bryan S Blankenagel

(74) *Attorney, Agent, or Firm* — Stetina Garred Brucker & Newboles

(57) ABSTRACT

A multi-stage noise suppression system for reducing noise components in a noisy input signal has a first stage neural network that estimates a noise power spectrum for the noisy input signal. A first set of gain values corresponding to the noise power spectrum is generated by the first stage neural network. A second stage neural network estimates clean signal power spectrum values, which are derived from an application of a second set of gain values generated as a function of the clean signal power spectrum values and a first stage reduced noise signal power spectrum values.

13 Claims, 3 Drawing Sheets

MULTISTAGE LOW POWER, LOW LATENCY, AND REAL-TIME DEEP LEARNING SINGLE MICROPHONE NOISE SUPPRESSION

CROSS-REFERENCE TO RELATED APPLICATIONS

This application relates to and claims the benefit of U.S. Provisional Application No. 63/159,893 filed Mar. 11, 2022 and entitled "Multistage Lower Power, Low Latency, and Real-Time Deep Learning Single Mic Noise Suppression (SMNS)" the entire disclosure of which is wholly incorporated by reference herein.

STATEMENT RE: FEDERALLY SPONSORED RESEARCH/DEVELOPMENT

Not Applicable

BACKGROUND

1. Technical Field

The present disclosure is directed to noise suppression for speech recognition and machine learning, and more specifically to multi-stage, low power, low latency, real-time deep learning noise suppression to remove as much noise as possible without distorting the underlying speech signal.

2. Related Art

In any communication system, signals of interest may be corrupted by ambient noises and other undesirable disturbing signals, all of which may be referred to generally as noise. Generally, noise refers to any components in the overall signal other than the signal(s) of interest. Noisy environments tend to lower the fidelity of the signal, thus rendering the signal(s) of interest difficult to understand and recognize. Accordingly, noise suppression is a critical process in a multitude of different systems, including audio systems.

A clear audio signal is needed in a wide range of applications, particularly where the human-understandable parts of the audio are to be recognized by a computer/data processing system to invoke further functionality of the same. These include simple voice-actuated devices that may be activated and deactivated with simple commands, dictation systems, as well as more sophisticated voice assistants that may be issued various commands or queries from the user. Such voice assistants may be quired to check the weather, activate or deactivate an IoT (Internet of Things) device, play music, or otherwise retrieve information from the Internet/Web. These voice assistants may be incorporated into standalone smart speaker devices, smartphones, and other portable devices. The clearer the speech audio, the higher the recognition success rate, thereby improving the user experience.

Noise suppression generally involves digital signal processing, with one well-known technique to reduce background noise being spectral subtraction. A voice activity detection (VAD) module detects the voice segments and the noise segments, and two spectrum estimates are generated: one estimate of the speech signal disturbed by a background noise signal spectrum, and an estimate of the background noise signal spectrum. These are combined to form an SNR-based (Signal to Noise Ratio) gain function in order to reduce the background noise. Such traditional DSP-based speech audio enhancements for noise suppression/reduction tends to degrade the signal, especially in harsh operating conditions such as in the presence of non-stationary noises or at very low signal-to-noise ratios.

Certain improved noise suppression techniques may be possible with the differential processing of multiple audio signals from separate microphones capturing sound from a single environment. However, for devices that only incorporate a single microphone, suppression of noise captured thereon without reliance on additional audio data is an important design objective as lower costs and flexibility of hardware system design may be realized over multi-microphone solutions. Accordingly, there is a need in the art for a deep-learning noise suppression method that removes as much noise as possible from a noisy signal without causing distortion of the underlying speech.

BRIEF SUMMARY

Multi-stage low-power, low latency, real-time deep learning noise suppression system and methods without distorting the underlying speech information in an audio stream is disclosed. Generally, the embodiments of the present disclosure, through use of AI/deep learning neural networks, are contemplated to offer superior performance compared to traditional DSP-based approaches. A novel architecture based upon a multi-stage noise suppression/reduction includes a first part in which the input noisy signal is estimated and used as a secondary input to a second part in which the final de-noised output signal is generated.

An embodiment of the present disclosure is a multi-stage noise suppression system for reducing noise components in a noisy input signal. The system may include a first stage neural network that estimates a noise power spectrum for the noisy input signal. A first set of gain values corresponding to the noise power spectrum is generated by the first stage neural network. The system may also include a second stage neural network that estimates clean signal power spectrum values. The estimated clean signal power spectrum values, in turn, are derived from an application of a second set of gain values generated as a function of the clean signal power spectrum values and a first stage reduced noise signal power spectrum.

According to another embodiment of the present disclosure, there may be a multi-stage noise suppression system for reducing noise components in a noisy input signal. The system may include a first noise gain extractor that generates a set of ideal noise gain values for each of a spectrum of discrete frequency segments in a frequency domain representation of the noisy input signal. The set of ideal noise gain values may be based upon estimates of the noise components in the noisy input signal. The system may further include a first noise signal processor that applies the set of ideal noise gain values to the spectrum of discrete frequency segments of the noisy input signal. Noise signal power spectrum values may be generated thereby. The system may include a noise subtractor that is receptive to the noise signal power spectrum values and the noisy input signal. The noise subtractor may generate a first stage reduced noise signal from the noisy input signal reduced by the noise signal power spectrum values. There may additionally be a second noise gain extractor that generates a set of ideal signal gain values for each of the spectrum of discrete frequency segments in the frequency domain representation of the noisy input signal as a function of the first stage reduced noise signal power spectrum values and clean signal power spectrum values. The system may further incorporate a second noise signal extractor that applies the set of ideal signal gain values to the frequency domain representation of the first stage reduced noise signal spectrum values. Clean signal power spectrum values may be generated as a result.

Still another embodiment of the present disclosure may be a method for multi-stage noise suppression. The method may include a step of generating a set of ideal noise gain values for each of a spectrum of discrete frequency segments in a frequency domain representation of a noisy input signal. The set of ideal noise gain values may be based upon estimates of noise components of the noisy input signal. There may also be a step of generating noise power spectrum values based upon an application of the set of ideal noise gain values to the spectrum of discrete frequency segments of the noisy input signal. Further, there may be a step of reducing the noisy input signal by the noise signal power spectrum values to generate a first stage reduced noise signal. The method may continue with generating a set of ideal signal gain values for each of the spectrum of discrete frequency segments in the frequency domain representation of the noisy input signal as a function of the first stage reduced noise signal and clean signal power spectrum values. The method may also include generating clean signal power spectrum values based upon an application of the set of ideal signal gain values to the frequency domain representation of the first stage reduced noise signal spectrum values.

Another embodiment is directed to a non-transitory computer readable medium that includes instructions executable by a data processing device to perform this noise suppression method. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of multi-stage deep learning noise suppression and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
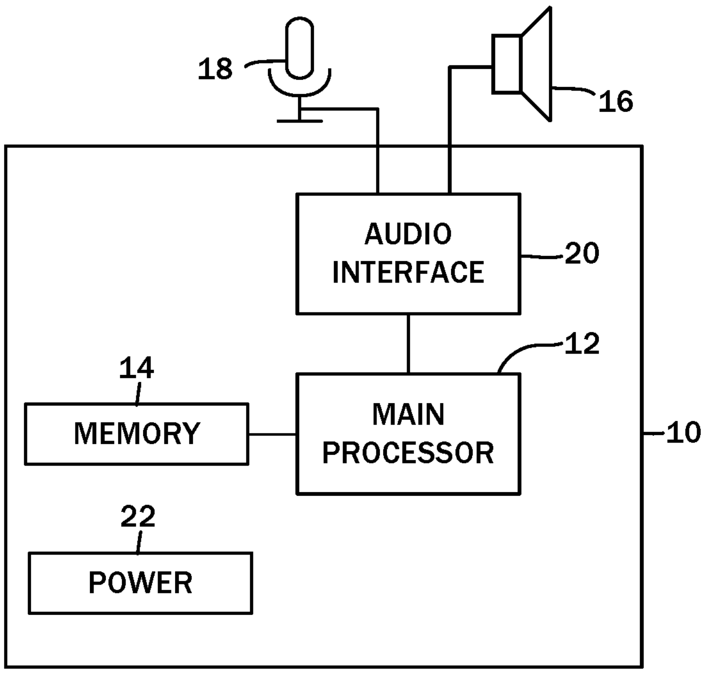
FIG. 1 is a block diagram of an exemplary data processing device with which various embodiments of a multi-stage noise suppression system may be implemented.

With reference to the block diagram of FIG. 1, the various embodiments of a multi-stage deep learning noise suppression system may be implemented on a data processing device 10. By way of example only and not of limitation, the data processing device 10 may be a smart speaker incorporating a virtual assistant with which users may interact via voice commands. In this regard, the data processing device 10 includes a main processor 12 that executes pre-programmed software instructions that correspond to various functional features of the data processing device 10. These software instructions, as well as other data that may be referenced or otherwise utilized during the execution of such software instructions, may be stored in a memory 14. As referenced herein, the memory 14 is understood to encompass random access memory as well as more permanent forms of memory.

In view of the data processing device 10 being a smart speaker, it is understood to incorporate a loudspeaker 16 that outputs sound from corresponding electrical signals applied thereto. The data processing device 10 may incorporate a microphone 18 for capturing sound waves and transducing the same to an electrical signal. According to various embodiments of the present disclosure, the data processing device 10 includes only one microphone, with the noise suppression system and method of the present disclosure being particularly suited for such a single microphone implementation. Of course, it will be recognized by those having ordinary skill in the art that this is by way of example only and not of limitation, and there may be alternative configurations in which the same noise suppression system/method may be implemented in connection with a device that includes two or more microphones.

Both the loudspeaker 16 and the microphone 18 may be connected to an audio interface 20, which is understood to include at least an analog-to-digital converter (ADC) and a digital-to-analog converter (DAC). It will be appreciated by those having ordinary skill in the art that the ADC is used to convert the electrical signal transduced from the input audio waves to discrete-time sampling values corresponding to instantaneous voltages of the electrical signal. This digital data stream, which may also be referred to more specifically as a PCM (pulse code modulation) file, may be processed by the main processor, or a dedicated digital audio processor. The DAC, on the other hand, converts the digital stream corresponding to the output audio to an analog electrical signal, which in turn is applied to the loudspeaker 16 to be transduced to sound waves. There may be additional amplifiers and other electrical circuits that within the audio interface 20, but for the sake of brevity, the details thereof are omitted.

As the data processing device 10 is electronic, electrical power must be provided thereto in order to enable the entire range of its functionality. In this regard, the data processing device 10 includes a power module 22, which is understood to encompass the physical interfaces to line power, an onboard battery, charging circuits for the battery, AC/DC converters, regulator circuits, and the like. Those having ordinary skill in the art will recognize that implementations of the power module 22 may span a wide range of configurations, and the details thereof will be omitted for the sake of brevity.

Although certain specifics of the data processing device 10 have been described in the context of a smart speaker, the embodiments of the present disclosure contemplates the noise suppression system being utilized with other devices that are understood to be broadly encompassed within the scope of the data processing device 10. For instance, instead of the smart speaker, the data processing device 10 may be a smart television set, a smartphone, or any other suitable electronic device with voice interface/recognition capabilities. The data processing device 10 may incorporate other features such as wired and/or wireless networking capabilities, but because such components are not directly pertinent to the noise suppression features of the present disclosure, such additional components will not be described in any further detail.

Figure 2:
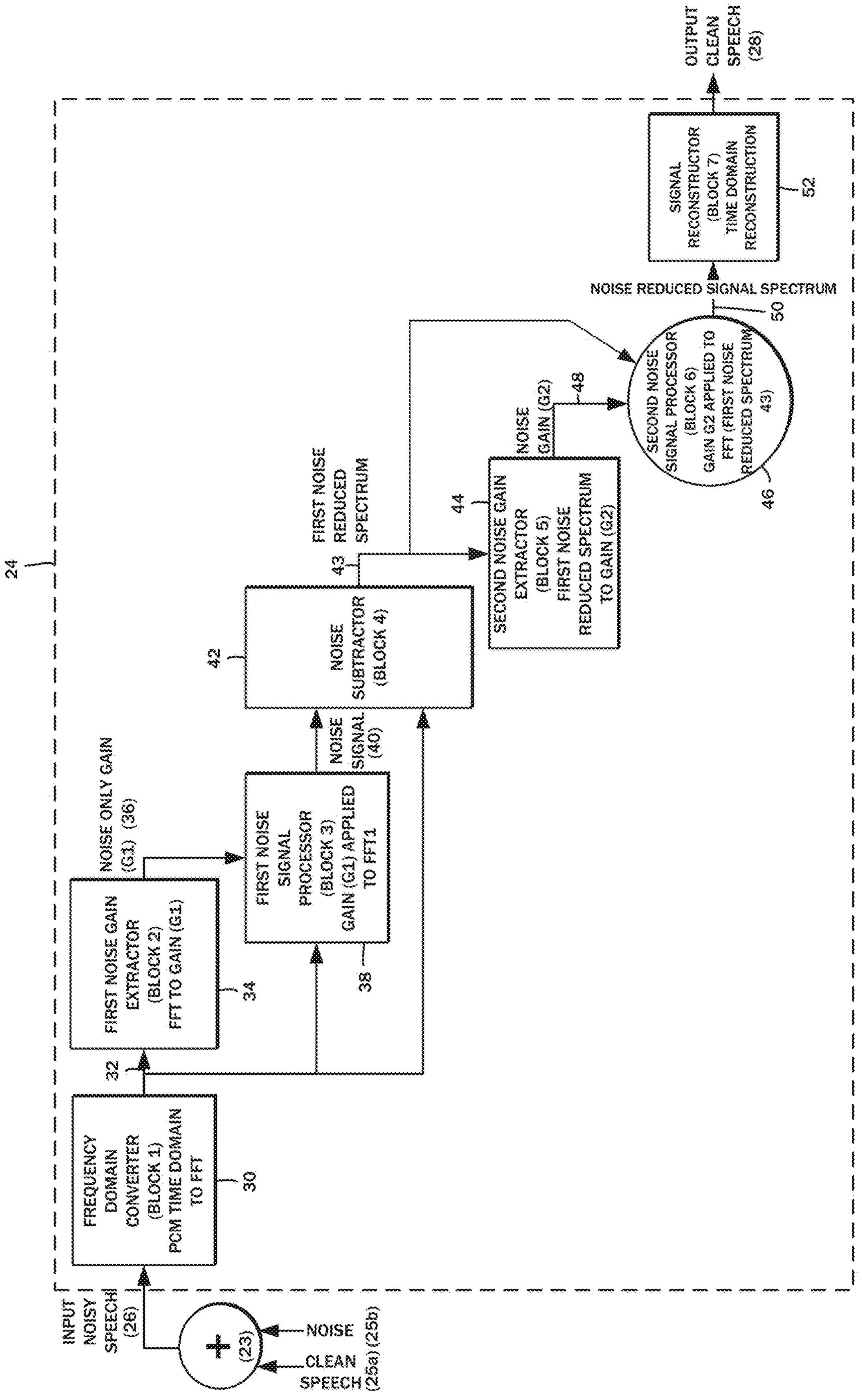
FIG. 2 is a block diagram of one embodiment of the multi-stage noise suppression system.

With reference to the block diagram of FIG. 2, a noise suppression system 24 in accordance with various embodiments of the disclosure is receptive to a noisy input signal 26 and following the processing procedure that will be detailed more fully below, outputs a clean speech audio or a noise-reduced signal 28. The noisy input signal 26 is understood to be a digitized, pulse-coded modulation (PCM) audio stream, which is a representation of the analog electrical signal output from the microphone 18 corresponding to the soundwaves from the surrounding environment as captured by the same. The sound waves, and the resulting electrical signal from the microphone 18 are understood to be comprised of a signal of interest, as well as various noise components that distort or otherwise render the signal of interest difficult to process/recognize. In this context, the desirable audio signal, which may also be referred to as a clean speech signal for implementations where speech from the user is translated to machine-comprehensible commands, may be referred to as a clean speech signal $x_c(n)$ 25*a*. The noise portion may be referenced as w(n) 25*b*. These two signals are mixed 23 at the microphone 18. Thus, the noisy input signal 26, s(n) is given by:

$$s(n)=x_c(n)+w(n)$$

The noise suppression system 24 operates on the frequency domain representation of the noisy input signal 26, and so one of its components is a frequency domain converter 30 that accepts the time-domain noisy input signal 26 and converts to a frequency domain representation, e.g., the discrete frequency segments 32. In one embodiment, a fast Fourier transform (FFT) function is applied to the PCM audio stream. The frequency domain transform of the signal s(n) is thus given by:

$$S(k)=X_c(k)+W(k)$$

The resultant output of the frequency domain converter is a spectrum of discrete frequency segments, which in the case of an FFT function, are frequency bins that accumulate data corresponding to each magnitude of that particular frequency present within the time-domain signal. The power spectrum of the noise components w(n) in the noisy input signal 26 may be referenced as $E_N(k)$, while the overall noisy input signal 26 or s(n) may be referenced as $E_S(k)$. Reference herein to FFT functions and the FFT bins is by way of example only and not of limitation, and the noise suppression system 24 may be adapted to operate on other frequency domain representations such as Mel-band. In such case, the discrete frequency segments may be Mel-band bands, where the separation between frequencies are based on the Mel-scale that is better adapted to human listening capabilities. It is deemed to be within the purview of those having ordinary skill in the art to adapt the various components of the noise suppression system 24 to such alternative representations, including the aforementioned frequency domain converter, as well as a time domain signal reconstructor that will be described more fully below.

The noise suppression system 24 is generally defined by a two-stage deep learning-based configuration. The first stage may be a first noise gain extractor 34 that generates a set of ideal noise gain values for each of a spectrum of the discrete frequency segments in the frequency domain representation of the noisy input signal 26. More specifically, the first noise gain extractor 34 is a deep learning neural network that estimates part of the noisy input signal 26 that corresponds to noise, $E_N(k)$. This value, together with the power spectrum of the overall noisy input signal 26, $E_S(k)$, an ideal gain 36 that is to be applied to each frequency bin of the noisy input signal 26. The ideal gain 36 are calculated as:

$$g_1(k)=\sqrt{E_N(k)/E_S(k)}$$

The gain 36, $g_1(k)$, are understood to be generated in a training phase of the neural network implementing the first noise gain extractor 34, where the network will attempt to identify the optimum weight values that will minimize the mean-square error between a target $g_1(k)$ and a gain value estimate $\hat{g}_1(k)$. It will be understood that the embodiments of the noise suppression system 24 need not be limited to training based upon a minimization of the mean-square error. Any other suitable criteria may be substituted without departing from the scope of the present disclosure. According to one embodiment of the present disclosure, the neural network may be a convolutional neural network (CNN), a long-term short memory network (LTSM), a recurrent neural network (RNN), a multi-layer perceptron (MLP), or any other suitable neural network implementation. A custom circuit design for these neural networks may also be included in the data processing device 10, such as those described in WO/2020056329, the disclosure of which is wholly incorporated by reference herein.

With the optimal neural network weight values, the aforementioned gain 36/$g_1(k)$ is computed in accordance with the process described above. The noise suppression system 24 further includes a first noise signal processor 38, which applies this set of ideal noise gain values generated by the first noise gain extractor 34 to the spectrum of discrete frequency segments 32 of the noisy input signal 26. In other words, the gain 36 are applied to the input noisy signal power spectrum $E_S(k)$, which results in noise power spectrum values 40 being generated, also referred to as $\hat{E}_N(k)$. These values are then provided to the next stage of the noise suppression system 24.

Prior to the second stage, there is understood to be a noise subtractor 42 that may be used to produce first reduced noise signal spectrum values 43. The noise subtractor 42 is understood to subtract the noise power spectrum values 40 from the discrete frequency segments 32 of the input noisy signal. The resultant output, i.e., the first reduced noise signal spectrum values 43, is the then passed to the second stage.

The second stage includes a second noise gain extractor 44, which may be implemented as a deep-learning neural network like the first stage, i.e., the first noise gain extractor 34. Generally, gain values to be applied to a power spectrum are also computed, but these gain values are the ideal signal gain values for each of the spectrum of discrete frequency segments (FFT bins). These ideal signal gain values are computed from the input noisy signal power spectrum $E_S(k)$ as provided by the earlier stage, that is, the first noise signal processor 38 and the first noise gain extractor 34. In one exemplary embodiment, the idea signal gain values $g_2(k)$, are calculated by:

$$g_2(k)=\sqrt{E_c(k)/E_S'(k)}$$

Again, $E_C(k)$ is understood to be the power spectrum of the clean signal $x_c(n)$, while $E_S'(k)$ is understood to be the first reduced noise signal spectrum values 43. The ideal signal gain values 48, or $g_2(k)$ may be generated during the training phase in which the neural network will attempt to identify optimum weight values to minimize the mean-square-error between a target $g_2(k)$ and a gain value estimate $\widehat{g_2(k)}$. It will be understood that the embodiments of the noise suppression system 24 need not be limited to training based upon a minimization of the mean-square error. Any other suitable criteria may be substituted without departing from the scope of the present disclosure. Like the first stage or the first noise gain extractor 34, such neural network may be a convolutional neural network (CNN), a long-term short memory network (LTSM), a recurrent neural network (RNN), a multi-layer perceptron (MLP), or any other suitable neural network implementation. Again, the data processing device 10 and specifically the neural network of this second stage may also be implemented with a custom circuit design.

The noise suppression system 24 further includes a second noise gain extractor 44 that receives the first reduced noise signal spectrum values 43 from the noise subtractor 42 to generate the ideal signal gain values. The second noise gain extractor 44 output the noise gain g2 to the second noise signal processor 46, where it is applied to the first reduced noise signal spectrum values 43 to generate the noise reduced signal spectrum 50. Thereafter, the reduced noise signal spectrum 50 is reconstructed as a time-domain signal corresponding to the reconstructed output clean signal 28. This step may be performed by the signal reconstructor 52.

Thus, generally, the first stage of the noise suppression system 24 utilizes a neural network to estimate the noise spectrum and generates gain values that are to be applied to the different FFT bins for deriving the noise power spectrum. In the second stage, another neural network is used to subtract the estimated noise from the input signal. Another set of gain values are generated for application to the different FFT bins to yield a clean signal power spectrum.

Figure 3:
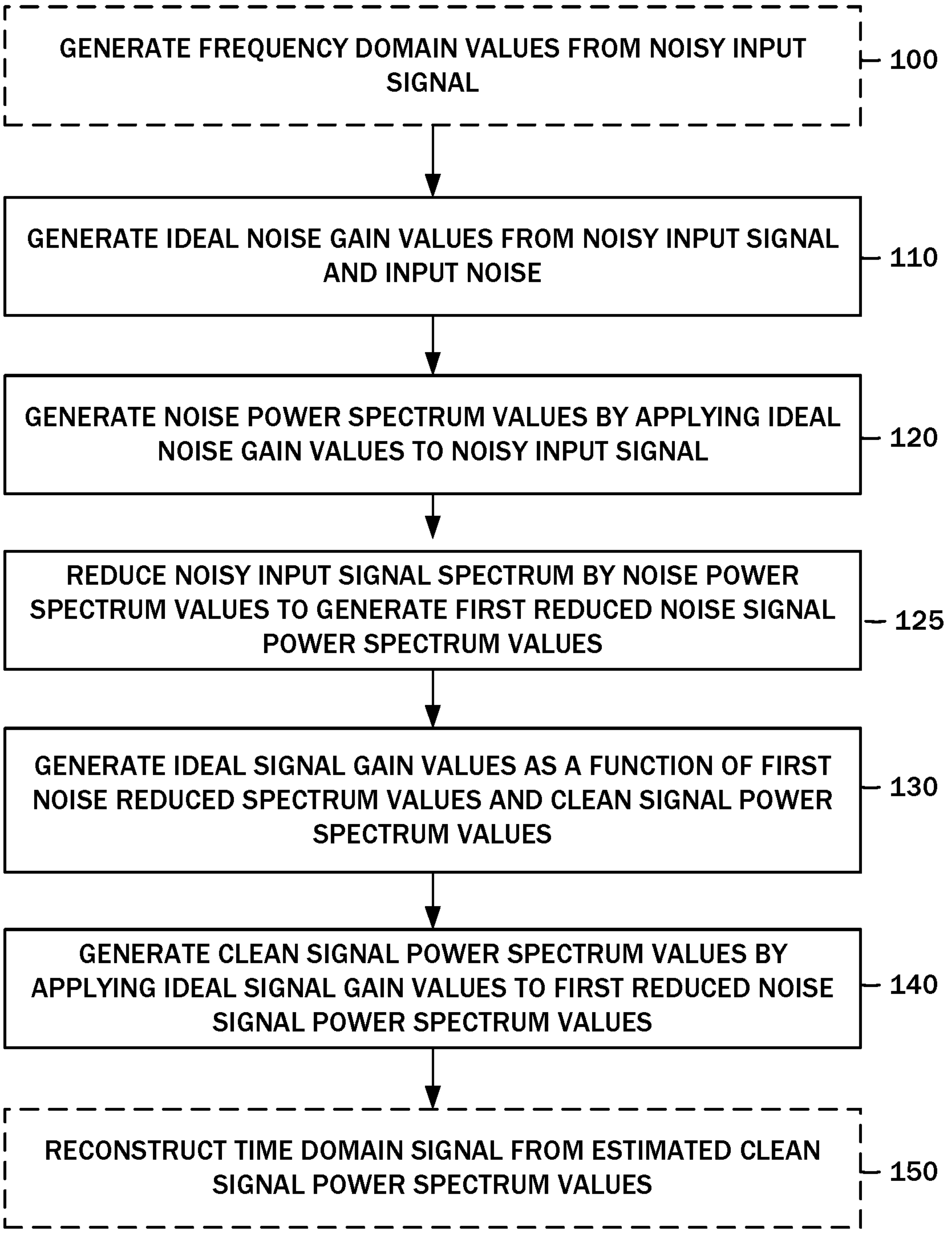
FIG. 3 is a flowchart illustrated an embodiment of a method for multi-stage noise suppression.

With reference to the flowchart of FIG. 3, according to another exemplary embodiment of the present disclosure, a method for multi-stage noise suppression may begin with an initial or preliminary step 100 of generating values for the spectrum of discrete frequency segments for the frequency domain representation of the noisy input signal 26. The resulting frequency domain representation is used to generate a set of ideal noise gain values for each of a spectrum of discrete frequency segments 32 in a step 110. As indicated above in connection with the description of the first noise gain extractor 34, the ideal noise gain values are based upon estimates of the noise components in the noisy input signal 26.

The method continues with a step 120 of generating the noise power spectrum values 40 based upon an application of the set of ideal noise gain values to the spectrum of discrete frequency segments 32 of the noisy input signal. This step may be performed by the first noise signal processor 38.

With the noise power spectrum values 40 and the spectrum of discrete frequency segments 32, the noise subtractor 42, in a step 125, reduces the noisy input signal spectrum values by the noise signal power spectrum values, to generate the first reduced noise signal spectrum values 43. Thereafter, in a step 130, the method continues with generating a set of ideal signal gain values therefor as a function of the first reduced noise signal spectrum values 43 and clean signal power spectrum values. Next, in a step 140, the second noise gain extractor 44 generates the ideal signal gain values 48 based upon the application of the set of ideal signal gain values to the first reduced noise signal spectrum values 43. The time domain signal with the noise components suppressed or removed may be generated the signal reconstructor 52 in accordance with a step 150.

In yet another embodiment of the present disclosure, a method for multi-stage noise suppression may begin with an initial or preliminary step of generating values for the spectrum of discrete frequency segments for the frequency domain representation of the noisy input signal 26. The resulting frequency domain representation is used to generate a set of estimated noise gain values $\widehat{g_1(k)}$) for each of a spectrum of discrete frequency segments 32. This estimate is generated by the first neural network. As indicated above in connection with the description of the first noise gain extractor 34, the estimated noise gain values are based upon estimates of the noise components in the noisy input signal 26.

The method continues with generating the estimated noise power spectrum values 40 based upon an application of the set of estimated noise gain values to the spectrum of discrete frequency segments 32 of the noisy input signal. This step may be performed by the first noise signal processor 38.

With the estimated noise power spectrum values 40 and the spectrum of discrete frequency segments 32, the noise subtractor 42 reduces the noisy input signal spectrum values by the estimated noise signal power spectrum values, to generate the first reduced noise signal spectrum values 43. Thereafter, the method continues with generating a set of estimated signal gain values therefor as a function of the first reduced noise signal spectrum values 43. Next, the second noise gain extractor 44 generates the estimated signal gain values 48 based upon the application of the set of estimated signal gain values to the first reduced noise signal spectrum values 43. The estimated signal gains are generated by the second neural network. These estimated gains $(\widehat{g_2(k)})$.

are applied to the first reduce noise signal spectrum values 43 to generate estimated clean speech spectrum values. The time domain signal with the noise components suppressed or removed may be generated by the signal reconstructor 52 from the estimated clean speech spectrum values.

The particulars shown herein are by way of example and for purposes of illustrative discussion of the embodiments of the multi-stage noise suppression system and method and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A multi-stage noise suppression system for cleaning a noisy input speech signal with an underlying speech combined with noise from a surrounding environment as captured from a single transducer source, comprising:

a first noise gain extractor generating a set of ideal noise gain values for each of a spectrum of discrete frequency segments in a frequency domain representation of the noisy input speech signal based upon estimates of the noise components in the noisy input speech signal, the first noise gain extractor being a first neural network specifically trained to generate the first set of ideal noise gain values based upon an identification of optimal neural network weight values from predetermined criteria tuned for speech captured from noisy environments;

a first noise signal processor applying the set of ideal noise gain values to the spectrum of discrete frequency segments of the noisy input speech signal with estimated noise power spectrum values being generated therefrom;

a noise subtractor receptive to the estimated noise power spectrum values and the noisy input speech signal, the noise subtractor generating partially denoised signal spectrum values as first stage outputs from the noisy input speech signal reduced by the estimated noise power spectrum values;

a second noise gain extractor generating a set of ideal signal gain values for each of the spectrum of discrete frequency segments in the frequency domain representation of the noisy input speech signal as an interdependent function of the partially denoised signal spectrum values, the second noise gain extractor being a second neural network independently trained on the first stage outputs to progressively derive the clean signal power spectrum values as a refinement of the partially denoised signal spectrum values from the first stage based upon identifying optimal neural network weight values from predetermined criteria tuned for speech captured from noisy environments;

a second noise signal processor applying the set of ideal signal gain values to the frequency domain representation of the noisy input speech signal with clean signal power spectrum values being generated therefrom; and a signal reconstructor receptive to the clean signal power spectrum values and the noisy input speech signal, a set of time-domain clean signal values representative of a cleaned underlying speech being generated by the signal reconstructor.

2. The multi-stage noise suppression system of claim 1, wherein the neural network is selected from a group consisting of: convolutional neural network (CNN), long-term short memory network (LTSM), recurrent neural network (RNN), and multi-layer perceptron (MLP).

3. The multi-stage noise suppression system of claim 1, wherein the neural network is selected from a group consisting of: convolutional neural network (CNN), long-term short memory network (LTSM), recurrent neural network (RNN), and multi-layer perceptron (MLP).

4. The multi-stage noise suppression system of claim 1, further comprising a frequency domain converter to generate corresponding values for the spectrum of discrete frequency segments in the frequency domain representation of the noisy input speech signal.

5. The multi-stage noise suppression system of claim 4, wherein the frequency domain converter applies a fast Fourier transform to the noisy input speech signal, the spectrum of discrete frequency segments being FFT bins.

6. The multi-stage noise suppression system of claim 4, wherein the frequency domain converter applies a Mel-band transformation to the noisy input speech signal, the spectrum of discrete frequency segments being Mel-band bands.

7. The multi-stage noise suppression system of claim 1, further comprising a signal reconstructor receptive to the clean signal power spectrum values and the noisy input speech signal, a set of time-domain clean signal values being generated by the signal reconstructor.

8. A method for multi-stage noise suppression for cleaning a noisy input speech signal with an underlying speech signal combined with noise from a surrounding environment as captured from a single transducer source, comprising the steps of:

generating a set of ideal noise gain values for each of a spectrum of discrete frequency segments in a frequency domain representation of the noisy input speech signal, the set of ideal noise gain values being based upon estimates of noise components of the noisy input speech signal, and being generated by a first neural network specifically trained based upon identifying optimal neural network weight values from predetermined criteria between target gain values and estimated gain values for speech captured from noisy environments;

generating noise power spectrum values based upon an application of the set of ideal noise gain values to the spectrum of discrete frequency segments of the noisy input speech signal;

reducing the noisy input speech signal by the estimated noise power spectrum values to generate partially denoised signal spectrum values as first stage outputs;

generating a set of ideal signal gain values for each of the spectrum of discrete frequency segments in the frequency domain representation of the noisy input speech signal as an interdependent function of the partially denoised signal spectrum values; and generating clean signal power spectrum values as a progressive refinement of the partially denoised signal spectrum values from the first stage based upon an application of the set of ideal signal gain values to the frequency domain representation of the noisy input speech signal with a second neural network independently trained on the first stage outputs based upon identifying optimal neural network weight values from predetermined criteria for speech captured from noisy environments; and reconstructing a set of time-domain clean signal values representative of a cleaned underlying speech from the clean signal power spectrum values.

9. The method of claim 8, wherein the first neural network is selected from a group consisting of: convolutional neural network (CNN), long-term short memory network (LTSM), recurrent neural network (RNN), and multi-layer perceptron (MLP).

10. The method of claim 8, wherein the second neural network is selected from a group consisting of: convolutional neural network (CNN), long-term short memory network (LTSM), recurrent neural network (RNN), and multi-layer perceptron (MLP).

11. The method of claim 8, further comprising:

generating the values for the spectrum of discrete frequency segments for the frequency domain representation of the noisy input speech signal.

12. The method of claim 11, wherein:

the values for the spectrum of discrete frequency segments are generated from an application of a fast Fourier transform (FFT) to the noisy input speech signal; and the spectrum of discrete frequency segments are FFT bins.

13. The method of claim 11, wherein:

the values for the spectrum of discrete frequency segments are generated from an application of a Mel-band transformation to the noisy input speech signal; and the spectrum of discrete frequency segments are Mel-band bands.

* * * * *